US011030527B2

(12) United States Patent
Adjaoute

(10) Patent No.: US 11,030,527 B2
(45) Date of Patent: Jun. 8, 2021

(54) METHOD FOR CALLING FOR PREEMPTIVE MAINTENANCE AND FOR EQUIPMENT FAILURE PREVENTION

(71) Applicant: Brighterion, Inc., Purchase, NY (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 0 days.

(21) Appl. No.: 16/856,131

(22) Filed: Apr. 23, 2020

(65) Prior Publication Data

US 2020/0250535 A1 Aug. 6, 2020

Related U.S. Application Data

(63) Continuation of application No. 14/815,940, filed on Jul. 31, 2015, now Pat. No. 10,671,915, which is a continuation-in-part of application No. 14/815,848, filed on Jul. 31, 2015, now abandoned.

(51) Int. Cl.
| | | |
|---|---|---|
| *G06F 9/44* | (2018.01) | |
| *G06N 3/08* | (2006.01) | |
| *G05B 23/02* | (2006.01) | |
| *G06N 20/00* | (2019.01) | |

(52) U.S. Cl.
CPC ........... *G06N 3/08* (2013.01); *G05B 23/0229* (2013.01); *G06N 20/00* (2019.01)

(58) Field of Classification Search
CPC .................................................... G06Q 40/00
USPC ......................................................... 706/52
See application file for complete search history.

(56) References Cited

U.S. PATENT DOCUMENTS

| | | |
|---|---|---|
| 5,377,354 A | 12/1994 | Scannell et al. |
| 5,692,107 A | 11/1997 | Simoudis et al. |
| 5,819,226 A | 10/1998 | Gopinathan et al. |
| 5,822,741 A | 10/1998 | Fischthal |
| 6,009,199 A | 12/1999 | Ho |
| 6,026,397 A | 2/2000 | Sheppard |
| 6,029,154 A | 2/2000 | Pettitt |
| 6,122,624 A | 9/2000 | Tetro et al. |

(Continued)

FOREIGN PATENT DOCUMENTS

| | | |
|---|---|---|
| DE | 4230419 | 3/1994 |
| EP | 0647903 | 4/1995 |

(Continued)

OTHER PUBLICATIONS

Office Action From U.S. Appl. No. 14/454,749 (dated Feb. 3, 2017).

(Continued)

*Primary Examiner* — Ojo O Oyebisi
(74) *Attorney, Agent, or Firm* — Hovey Williams LLP

(57) ABSTRACT

A method for operating digital electronic appliance that empanels several different artificial intelligence (AI) classification technologies into a "jury" uses combinational digital logic to render "verdicts" about the need for service and impending equipment failures of the machines they monitor. Networks can be used to forward signals from remote locations to a centralized appliance that may be plugged as a module into a server. The appliance outputs can also be communicated over networks to servers that will muster appropriate maintenance personnel who are forewarned as to the nature of the trouble.

20 Claims, 4 Drawing Sheets

(56) References Cited

U.S. PATENT DOCUMENTS

| | | |
|---|---|---|
| 6,161,130 A | 12/2000 | Horvitz et al. |
| 6,254,000 B1 | 7/2001 | Degen et al. |
| 6,272,479 B1 | 8/2001 | Farry et al. |
| 6,330,546 B1 | 12/2001 | Gopinathan et al. |
| 6,347,374 B1 | 2/2002 | Drake et al. |
| 6,424,997 B1 | 7/2002 | Buskirk, Jr. et al. |
| 6,453,246 B1 | 9/2002 | Agrafiotis et al. |
| 6,535,728 B1 | 3/2003 | Perfit et al. |
| 6,601,048 B1 | 7/2003 | Gavan et al. |
| 6,647,379 B2 | 11/2003 | Howard et al. |
| 6,711,615 B2 | 3/2004 | Porras et al. |
| 6,782,375 B2 | 8/2004 | Abdel-Moneim et al. |
| 6,889,207 B2 | 5/2005 | Slemmer et al. |
| 7,007,067 B1 | 2/2006 | Azvine et al. |
| 7,036,146 B1 | 4/2006 | Goldsmith |
| 7,089,592 B2 | 8/2006 | Adjaoute |
| 7,165,037 B2 | 1/2007 | Lazarus et al. |
| 7,251,624 B1 | 7/2007 | Lee et al. |
| 7,406,502 B1 | 7/2008 | Oliver et al. |
| 7,433,960 B1 | 10/2008 | Dube et al. |
| 7,457,401 B2 | 11/2008 | Lawyer et al. |
| 7,464,264 B2 | 12/2008 | Goodman et al. |
| 7,483,947 B2 | 1/2009 | Starbuck et al. |
| 7,562,122 B2 | 7/2009 | Oliver et al. |
| 7,631,362 B2 | 12/2009 | Ramsey |
| 7,668,769 B2 | 2/2010 | Baker et al. |
| 7,813,937 B1 | 10/2010 | Pathria et al. |
| 7,835,919 B1 | 11/2010 | Bradley et al. |
| 7,853,469 B2 | 12/2010 | Maitland et al. |
| 8,015,108 B2 | 9/2011 | Haggerty et al. |
| 8,027,439 B2 | 9/2011 | Zoldi et al. |
| 8,036,981 B2 | 10/2011 | Shirey et al. |
| 8,041,597 B2 | 10/2011 | Li et al. |
| 8,090,648 B2 | 1/2012 | Zoldi et al. |
| 8,458,069 B2 | 6/2013 | Adjaoute |
| 8,484,301 B2 | 7/2013 | Wilson et al. |
| 8,548,137 B2 | 10/2013 | Zoldi et al. |
| 8,555,077 B2 | 10/2013 | Davis et al. |
| 8,561,007 B2 | 10/2013 | Challenger et al. |
| 8,572,736 B2 | 10/2013 | Lin |
| 8,744,979 B2 | 6/2014 | Sundelin et al. |
| 8,805,737 B1 | 8/2014 | Chen et al. |
| 9,264,442 B2 | 2/2016 | Bart et al. |
| 9,400,879 B2 | 7/2016 | Tredoux et al. |
| 9,721,296 B1 | 8/2017 | Chrapko |
| 9,898,741 B2 | 2/2018 | Siegel et al. |
| 10,339,606 B2 | 7/2019 | Gupta et al. |
| 2002/0188533 A1 | 12/2002 | Sanchez et al. |
| 2002/0194119 A1 | 12/2002 | Wright et al. |
| 2003/0009495 A1 | 1/2003 | Adjaoute |
| 2003/0084449 A1 | 5/2003 | Chane et al. |
| 2003/0158751 A1 | 8/2003 | Suresh et al. |
| 2004/0073634 A1 | 4/2004 | Haghpassand |
| 2004/0111363 A1 | 6/2004 | Trench et al. |
| 2004/0153555 A1 | 8/2004 | Haverinen et al. |
| 2004/0225473 A1 | 11/2004 | Aoki et al. |
| 2006/0041464 A1 | 2/2006 | Powers et al. |
| 2006/0149674 A1 | 7/2006 | Cook et al. |
| 2006/0212350 A1 | 9/2006 | Ellis et al. |
| 2007/0067853 A1 | 3/2007 | Ramsey |
| 2007/0112667 A1 | 5/2007 | Rucker |
| 2007/0124246 A1 | 5/2007 | Lawyer et al. |
| 2007/0174164 A1 | 7/2007 | Biffle et al. |
| 2007/0174214 A1 | 7/2007 | Welsh et al. |
| 2007/0239604 A1 | 10/2007 | O'Connell et al. |
| 2008/0086365 A1 | 4/2008 | Zollino et al. |
| 2008/0104101 A1 | 5/2008 | Kirshenbaum et al. |
| 2008/0162259 A1 | 7/2008 | Patil et al. |
| 2008/0281743 A1 | 11/2008 | Pettit |
| 2009/0307028 A1 | 12/2009 | Eldon et al. |
| 2010/0027527 A1 | 2/2010 | Higgins et al. |
| 2010/0082751 A1 | 4/2010 | Meijer et al. |
| 2010/0115610 A1 | 5/2010 | Tredoux et al. |
| 2010/0125470 A1 | 5/2010 | Chisholm |
| 2010/0191634 A1* | 7/2010 | Macy ................. G06N 3/08 705/35 |
| 2010/0228656 A1 | 9/2010 | Wasserblat et al. |
| 2010/0305993 A1 | 12/2010 | Fisher |
| 2011/0016041 A1 | 1/2011 | Scragg |
| 2011/0035440 A1 | 2/2011 | Henkin et al. |
| 2011/0055196 A1 | 3/2011 | Sundelin et al. |
| 2011/0055264 A1 | 3/2011 | Sundelin et al. |
| 2011/0238566 A1 | 9/2011 | Santos |
| 2011/0258049 A1 | 10/2011 | Ramer et al. |
| 2011/0276468 A1 | 11/2011 | Lewis et al. |
| 2011/0307382 A1 | 12/2011 | Siegel et al. |
| 2012/0047072 A1 | 2/2012 | Larkin |
| 2012/0137367 A1 | 5/2012 | Dupont et al. |
| 2012/0203698 A1 | 8/2012 | Duncan et al. |
| 2012/0226613 A1 | 9/2012 | Adjaoute |
| 2013/0018796 A1 | 1/2013 | Kolhatkar et al. |
| 2013/0204755 A1 | 8/2013 | Zoldi et al. |
| 2013/0305357 A1 | 11/2013 | Ayyagari et al. |
| 2014/0082434 A1 | 3/2014 | Knight et al. |
| 2014/0149128 A1 | 5/2014 | Getchius |
| 2014/0180974 A1 | 6/2014 | Kennel et al. |
| 2014/0279803 A1 | 9/2014 | Burbank et al. |
| 2015/0046224 A1 | 2/2015 | Adjaoute |
| 2015/0161609 A1 | 6/2015 | Christner |
| 2015/0193263 A1 | 7/2015 | Nayyar et al. |
| 2015/0279155 A1 | 10/2015 | Chun et al. |
| 2015/0348042 A1 | 12/2015 | Jivraj et al. |
| 2016/0260102 A1 | 9/2016 | Nightengale et al. |
| 2017/0006141 A1 | 1/2017 | Bhadra |
| 2017/0083386 A1 | 3/2017 | Wing et al. |
| 2017/0270534 A1 | 9/2017 | Zoldi et al. |
| 2017/0347283 A1 | 11/2017 | Kodaypak |
| 2018/0040064 A1 | 2/2018 | Grigg et al. |
| 2018/0048710 A1 | 2/2018 | Altin |
| 2018/0151045 A1 | 5/2018 | Kim et al. |
| 2018/0182029 A1 | 6/2018 | Vinay |
| 2018/0208448 A1 | 7/2018 | Zimmerman et al. |
| 2018/0253657 A1 | 9/2018 | Zhao et al. |
| 2019/0156417 A1 | 5/2019 | Zhao et al. |
| 2019/0213498 A1 | 7/2019 | Adjaoute |
| 2019/0236695 A1 | 8/2019 | McKenna et al. |
| 2019/0250899 A1 | 8/2019 | Riedl et al. |
| 2019/0265971 A1 | 8/2019 | Behzadi et al. |
| 2019/0278777 A1 | 9/2019 | Malik et al. |

FOREIGN PATENT DOCUMENTS

| | | |
|---|---|---|
| EP | 0631453 | 12/2001 |
| WO | 9406103 | 3/1994 |
| WO | 9501707 | 1/1995 |
| WO | 9628948 | 9/1996 |
| WO | 9703533 | 1/1997 |
| WO | 98/32086 | 7/1998 |

OTHER PUBLICATIONS

Office Action From U.S. Appl. No. 14/514,381 (dated Dec. 31, 2014).

Office Action From U.S. Appl. No. 14/514,381 (dated May 13, 2015).

Office Action From U.S. Appl. No. 14/514,381 (dated Jan. 10, 2018).

Office Action From U.S. Appl. No. 14/514,381 (dated Apr. 2, 2018).

Office Action From U.S. Appl. No. 14/815,848 (dated Sep. 30, 2015).

Office Action From U.S. Appl. No. 14/815,848 (dated Mar. 14, 2016).

Office Action From U.S. Appl. No. 14/815,934 (dated Sep. 30, 2015).

Office Action From U.S. Appl. No. 14/815,934 (dated Feb. 11, 2016).

Office Action From U.S. Appl. No. 14/815,934 (dated Sep. 23, 2016).

Office Action From U.S. Appl. No. 14/815,934 (dated Apr. 7, 2017).

Office Action From U.S. Appl. No. 14/815,940 (dated Oct. 1, 2015).

(56) References Cited

OTHER PUBLICATIONS

Office Action From U.S. Appl. No. 14/815,940 (dated Dec. 28, 2017).
Office Action From U.S. Appl. No. 14/929,341 (dated Dec. 22, 2015).
Office Action From U.S. Appl. No. 14/929,341 (dated Feb. 4, 2016).
Office Action From U.S. Appl. No. 14/929,341 (dated Aug. 19, 2016).
Office Action From U.S. Appl. No. 14/929,341 (dated Jul. 31, 2018).
Office Action From U.S. Appl. No. 14/938,844 (dated Apr. 11, 2016).
Office Action From U.S. Appl. No. 14/938,844 (dated Jan. 25, 2017).
Office Action From U.S. Appl. No. 14/938,844 (dated May 1, 2017).
Office Action From U.S. Appl. No. 14/938,844 (dated Aug. 23, 2017).
Office Action From U.S. Appl. No. 14/935,742 (dated Mar. 2, 2016).
Office Action From U.S. Appl. No. 14/935,742 (dated Sep. 22, 2016).
Office Action From U.S. Appl. No. 14/935,742 (dated Mar. 29, 2017).
Office Action From U.S. Appl. No. 14/935,742 (dated May 31, 2017).
Office Action From U.S. Appl. No. 14/941,586 (dated Jan. 5, 2017).
Office Action From U.S. Appl. No. 14/941,586 (dated May 2, 2017).
Office Action From U.S. Appl. No. 14/956,392 (dated Feb. 2, 2016).
Office Action From U.S. Appl. No. 14/956,392 (dated Mar. 28, 2016).
Office Action From U.S. Appl. No. 14/956,392 (dated Nov. 3, 2016).
Office Action From U.S. Appl. No. 14/956,392 (dated May 3, 2017).
Office Action From U.S. Appl. No. 14/986,534 (dated May 20, 2016).
Office Action From U.S. Appl. No. 14/986,534 (dated Sep. 7, 2017).
Office Action From U.S. Appl. No. 14/517,771 (dated Jul. 15, 2015).
Office Action From U.S. Appl. No. 14/517,771 (dated Dec. 31, 2015).
Office Action From U.S. Appl. No. 14/517,771 (dated Sep. 8, 2016).
Office Action From U.S. Appl. No. 14/517,771 (dated Sep. 20, 2018).
Office Action From U.S. Appl. No. 14/517,863 (dated Feb. 5, 2015).
Office Action From U.S. Appl. No. 14/517,863 (dated Aug. 10, 2015).
Office Action From U.S. Appl. No. 14/675,453 (dated Jun. 9, 2015).
Office Action From U.S. Appl. No. 14/517,872 (dated Jan. 14, 2015).
Office Action From U.S. Appl. No. 14/517,872 (dated Jul. 31, 2015).
Office Action From U.S. Appl. No. 14/520,361 (dated Feb. 2, 2015).
Office Action From U.S. Appl. No. 14/520,361 (dated Jul. 17, 2015).
Office Action From U.S. Appl. No. 14/520,361 (dated Jul. 11, 2018).
Office Action From U.S. Appl. No. 14/521,386 (dated Jan. 29, 2015).
Office Action From U.S. Appl. No. 14/521,386 (dated Nov. 1, 2018).
Office Action From U.S. Appl. No. 14/521,667 (dated Jan. 2, 2015).
Office Action From U.S. Appl. No. 14/521,667 (dated Jun. 26, 2015).
Office Action From U.S. Appl. No. 14/634,786 (dated Oct. 2, 2015).
Office Action From U.S. Appl. No. 14/673,895 (dated Oct. 30, 2015).
Office Action From U.S. Appl. No. 14/673,895 (dated Feb. 12, 2016).
Office Action From U.S. Appl. No. 14/673,895 (dated Jul. 14, 2017).
Office Action From U.S. Appl. No. 14/673,895 (dated Oct. 2, 2017).
Office Action From U.S. Appl. No. 14/690,380 (dated Jul. 15, 2015).
Office Action From U.S. Appl. No. 14/690,380 (dated Dec. 3, 2015).
Office Action From U.S. Appl. No. 14/690,380 (dated Jun. 30, 2016).
Office Action From U.S. Appl. No. 14/690,380 (dated Nov. 17, 2016).
Office Action From U.S. Appl. No. 14/690,380 (dated Jun. 27, 2017).
Office Action From U.S. Appl. No. 14/690,380 (dated Nov. 20, 2017).
"10 Popular health care provider fraud schemes" by Charles Piper, Jan./Feb. 2013, Fraud Magazine, www.fraud-magazine.com.
Report to the Nations on Occupational Fraud and Abuse, 2012 Global Fraud Study, copyright 2012, 76 pp., Association of Certified Fraud Examiners, Austin, TX.
Big Data Developments in Transaction Analytics, Scott Zoldi, Credit Scoring and Credit Control XIII Aug. 28-30, 2013 Fair Isaacs Corporation (FICO).
Credit card fraud detection using artificial neural networks tuned by genetic algorithms, Dissertation: Carsten A. W. Paasch, Copyright 2013 Proquest, LLC.
Fraud Detection Using Data Analytics in the Healthcare Industry, Discussion Whitepaper, ACL Services Ltd., (c) 2014, 8pp.
Fraud Detection of Credit Card Payment System by Genetic Algorithm, K.RamaKalyani, D. UmaDevi Department of Computer Science, Sri Mittapalli College of Engineering, Guntur, AP, India., International Journal of Scientific & Engineering Research vol. 3, Issue 7, Jul. 1, 2012, ISSN 2229-5518.
Healthcare Fraud Detection, http://IJINIIW.21ct.com'solutions/healthcare-fraud-detection/, (c) 2013 21CT, Inc.
Prevent Real-time fraud prevention, brochure, Brighterion, Inc. San Francisco, CA.
"Agent-Based modeling: Methods and Techniques for Simulating Human Systems", Eric Bonabeau, Icosystem Corporation, 545 Concord Avenue, Cambridge, MA 02138, 7280-7287; PNAS; May 14, 2002; vol. 99; suppl. 3; www.pnas.org/cgi/doi/10.1073/pnas.082080899.
Office Action from U.S. Appl. No. 09/810,313 (dated Mar. 24, 2006).
Office Action from U.S. Appl. No. 09/810,313 (dated Nov. 23, 2004).
Office Action from U.S. Appl. No. 11/455,146 (dated Sep. 29, 2009).
P.A. Porras and P.G. Neumann, "EMERALD: Event Monitoring Enabling Responses to Anomalous Live Disturbances," National Information Systems Security Conference, Oct. 1997.
P.E. Proctor, "Computer Misuse Detection System (CMDSTM) Concpets," SAIC Science and technology Trends, pp. 137-145, Dec. 1996.
S. Abu-Hakima, M. ToLoo, and T. White, "A Multi-Agent Systems Approach for Fraud Detection in Personal Communication Systems," Proceedings of the Fourteenth National Conference on Artificial Intelligence (AAAI-97), pp. 1-8, Jul. 1997.
Teng et al., "Adaptive real-time anomaly detection using inductively generated sequential patterns", Proceedings of the Computer Society Symposium on research in Security and Privacy, vol. SYMP. 11, May 7, 1990, 278-284.
Office Action from U.S. Appl. No. 14/522,463 (dated Oct. 3, 2019).
Office Action from U.S. Appl. No. 14/522,463 (dated Jul. 18, 2019).
Office Action From U.S. Appl. No. 16/205,909 (dated Dec. 27, 2019).
Office Action From U.S. Appl. No. 16/205,909 (dated Sep. 27, 2019).
Office Action From U.S. Appl. No. 16/398,917 (dated Sep. 26, 2019).
Office Action From U.S. Appl. No. 15/947,790 (dated Nov. 18, 2019).
Office Action From U.S. Appl. No. 14/525,273 (dated Jun. 26, 2018).
Office Action From U.S. Appl. No. 14/525,273 (dated Feb. 9, 2015).
Office Action From U.S. Appl. No. 14/525,273 (dated May 19, 2015).
Office Action From U.S. Appl. No. 15/968,568 (dated Sep. 16, 2019).
Office Action From U.S. Appl. No. 15/961,752 (dated Oct. 3, 2019).
Clarke et al., Dynamic Forecasting Behavior by Analysts Theory and Evidence, 2005, Journal of Financial Economics (Year:2005).
Data Compaction, 2013, Wikipedia, printed through www.archive.org (Year:2013).
Data Consolidation, 2014, Techopedia, printed through www.archive.org (Year:2014).

(56) References Cited

OTHER PUBLICATIONS

Data Mining Mar. 31, 2014. Wikipedia, Printed through www.archive.org, (Year:2014).
Data Warehousing—Metadata Concepts, Mar. 24, 2014, TutorialsPoint, printed through www.archive.org (Year:2014).
Dave, Kushal, Steve Lawrence, and David M. Pennock. "Mining the peanut gallery: Opinion extration and semantic classification of product reviews." Proceedings of the 12th international conference on WorldWide Web. ACM. 2003.
I Need Endless Rolling List, 2007, QuinStreet, Inc. (Year: 2007).
Office Action From U.S. Appl. No. 14/243,097 (dated Jun. 16, 2015).
Office Action From U.S. Appl. No. 14/243,097 (dated Nov. 5, 2018).
Office Action From U.S. Appl. No. 14/522,463 (dated Dec. 1, 2015).
Office Action From U.S. Appl. No. 14/522,463 (dated Feb. 11, 2019).
Office Action From U.S. Appl. No. 14/522,463 (dated Jun. 20, 2018).
Office Action From U.S. Appl. No. 14/522,463 (dated Jun. 5, 2015).
Office Action From U.S. Appl. No. 14/522,463 (dated Oct. 10, 2018).
Office Action From U.S. Appl. No. 14/613,383 (dated Apr. 23, 2018).
Office Action From U.S. Appl. No. 14/613,383 (dated Aug. 14, 2015).
Office Action From U.S. Appl. No. 14/613,383 (dated Dec. 13, 2018).
Yang, Yiming. "Expert network: Effective and efficient learning from human decisions in text categorization and retrieval." Proceedings of the 17th annual international ACM SIGIR conference on Research and development in Information retrieval Springer-Verlag New York, Inc., 1994.
"2000 Internet Fraud Statistics," National Fraud Information Center web site, http://www.fraud.org, 2001.
"AXENT Technologies' NetProwlerTM and Intruder AlertTM", Hurwitz Report, Hurwitz Group, Inc., Sep. 2000.
"CBA 1994 Fraud Survey," California Bankers Association web site, http://www.calbankers.com/legal/fraud.html, Jun. 1996.
"Check Fraud Against Businesses Proliferates," Better Business Bureau web site, http://www.bbb.org/library/checkfraud.asp, 2000.
"Check Fraud Statistics," National Check Fraud Center web site, http://www.ckfraud.org/statistics.html, Date Unkonwn.
"Consumers and Business Beware of Advance Fee Loan and Credit Card Fraud," Better Business Bureau web site, http://www.bbb.org/library/feeloan.asp, 20003.
"CyberSource Fraud Survey," CyberSource, Inc., web site, http://www.cybersource.com/solutions/risk_management/us_fraud_survey.xml, Date Unknown.
"eFalcon Helps E-Merchants Control Online Fraud," Financial Technology Insights Newsletter, HNC Software, Inc., Aug. 2000.
"Guidelines to Healthcare Fraud," National health care Anti-Fraud Association web site, http://www.nhcaa.org/factsheet_guideline.html, Nov. 19, 1991.
"Health Insurance Fraud," http://www.helpstopcrime.org, Date Unknown.
"HIPPA Solutions: Waste, Fraud, and Abuse," ViPS, Inc., web site, http://www.vips.com/hippa/combatwaste.html, 2001.
"HNC Insurance Solutions Introduces Spyder Software for Healthcare Fraud and Abuse Containment," HNC Software, Inc., press release, Dec. 4, 1998.
"Homeowners Insurance Fraud," http://www.helpstopcrime.org, Date Unknown.
"Insurance Fraud: The Crime You Pay For," http://www.insurancefraud.org/facts.html, Date Unknown.
"PRISM FAQ", Nestor, Inc., www.nestor.com, Date Unknown.
"SET Secure Electronic Transaction Sepcification," Book 1: Business Description, May 1997.
"Telemarketing Fraud Revisited," Better Business Bureau web site, http://www.bbb.org/library/tele.asp, 2000.
"The Impact of Insurance Fraud," Chapter 5, Ohio Insurance Facts, Ohio Insurance Institute, 2000.
"VeriCompTM Claimant," HNC Software, Inc., web site, 2001.
"What is Insurance Fraud?," http://www.helpstopcrime.rog, Date Unkonwn.
"Wireless Fraud FAQ," World of Wireless Communications web site, http://www.wow-com/consumer/faq/articles.cfm?textonly=1&ID=96, Date Unknown.
"Workers Compensation Fraud," http://www.helpstopcrime.org, Date Unknown.
A. Aadjaoute, "Responding to the e-Commerce Promise with Non-Algorithmic Technology," Handbook of E-Business, Chapter F2, edited by J. Keyes, Jul. 2000.
A. Valdes and H. Javitz,"The SRI IDES Statistical Anomaly Detector," May 1991.
D. Anderson, T. Frivold, and A. Valdes, "NExt-Generation intrusion Detection Expert System (NIDES): A Summary," SRI Computer Science Laboratory technical report SRI-CSL-95-07, May 1995.
Debar et al., "Neural network Component for an Intrusion Detection System", Proceedings for the Computer Society Symposium on Research in Security and Privacy, vol. SYMP.13, May 4, 1992, 240-250.
Denault et al., "Intrusion Detection: approach and performance issues of the SECURENET system", Computers and Security, 13 (1994), 495-508.
John J. Xenakis, 1990, InformationWeek, 1990. n296,22.
K. G. DeMarrais, "Old-fashioned check fraud still in vogue," Bergen record Corp. web site, http://www.bergen.com/biz/savvy24200009242.htm, Sep. 24, 2000.
M. B. Guard, "Calling Card Fraud—Travelers Beward!," http://www.bankinfo.com/security/scallingcardhtml, Jun. 11, 1998.
Maria Seminerio, Dec. 13, 1999, PC week, 99.
Office Action from U.S. Appl. No. 09/810,313 (dated Jun. 22, 2005).
Office Action From U.S. Appl. No. 16/168,566 (dated Mar. 4, 2020).
Office Action From U.S. Appl. No. 14/522,463 (dated Mar. 24, 2020).
Office Action From U.S. Appl. No. 16/205,909 (dated Apr. 22, 2020).
Office Action From U.S. Appl. No. 16/398,917 (dated Mar. 11, 2020).
Office Action From U.S. Appl. No. 16/369,626 (dated Jun. 2, 2020).
Raid, Feb. 28, 2014, www.prepressure.com, printed through www.archive.org (Year: 2014).
Office Action From U.S. Appl. No. 16/264,144 (dated Oct. 16, 2020).
Office Action From U.S. Appl. No. 16/168,566 (dated Dec. 18, 2020).
Office Action From U.S. Appl. No. 15/866,563 (dated Nov. 27, 2020).
Office Action From U.S. Appl. No. 16/168,566 (dated Sep. 9, 2020).
Office Action From U.S. Appl. No. 16/226,246 (dated Aug. 4, 2020).
Office Action From U.S. Appl. No. 16/184,894 (dated Sep. 21, 2020).
Office Action From U.S. Appl. No. 16/592,249 (dated Sep. 14, 2020).
Office Action From U.S. Appl. No. 16/601,226 (dated Sep. 2, 2020).
Office Action From U.S. Appl. No. 16/674,980 (dated Sep. 3, 2020).
Office Action From U.S. Appl. No. 16/677,458 (dated Sep. 24, 2020).
Office Action From U.S. Appl. No. 16/679,819 (dated Sep. 25, 2020).

* cited by examiner

METHOD FOR CALLING FOR PREEMPTIVE MAINTENANCE AND FOR EQUIPMENT FAILURE PREVENTION

RELATED APPLICATIONS

The current patent application is a continuation patent application which claims priority benefit with regard to all common subject matter to identically-titled U.S. patent application Ser. No. 14/815,940, filed Jul. 31, 2015, which, itself, is a continuation-in-part application of and claims priority benefit with regard to all common subject matter to U.S. patent application Ser. No. 14/815,848, filed Jul. 31, 2015, entitled AUTOMATION TOOL DEVELOPMENT METHOD FOR BUILDING COMPUTER FRAUD MANAGEMENT APPLICATIONS. The listed earlier-filed non-provisional applications are hereby incorporated by reference in their entireties into the current patent application

BACKGROUND OF THE INVENTION

Field of the Invention

The present invention relates to methods for protecting groups of digital electronic appliances used collectively for monitoring the operation of machines and for issuing predictions, warnings and calls for preventative maintenance and equipment failure interventions, and more particularly to methods that use computer data processing systems to empanel several artificial intelligence (AI) classification technologies into a "jury" that renders "verdicts" about the need for service and impending equipment failures.

Background

Digital signal processors (DSP) implemented as specialized semiconductor intellectual property (SIP) cores have circuit architectures that have been optimized for the operational needs of digital signal processing. DSP's are used to measure, filter and/or compress continuous real-world analog signals. Many general-purpose microprocessors can also execute digital signal processing algorithms successfully, but dedicated DSP's usually have better power efficiency thus they are more suitable in portable devices such as mobile phones because of power consumption constraints. DSP's frequently use special memory architectures that are able to fetch multiple data and/or instructions at the same time.

Xilinx defines Field Programmable Gate Arrays (FPGA's) as semiconductor devices that are based around a matrix of configurable logic blocks (CLB's) connected via programmable interconnects. FPGA's can be reprogrammed to desired application or functionality requirements after manufacturing. This feature distinguishes FPGA's from Application Specific Integrated Circuits (ASIC's), which are custom manufactured for specific design tasks. Although one-time programmable (OTP) FPGA's are available, the dominant types today are based on static random access memory (SRAM) which can be reprogrammed circuit by circuit as the design evolves.

ASIC's and FPGA's have different value propositions, and so the choices must be evaluated. FPGA's once were selected for their lower speed/complexity/volume designs. But modern FPGA's now push the so-called 500-MHz performance barrier and are benefitting from logic density increases, embedded processors, DSP blocks, clocking, and high-speed serial, at ever lower price points.

Another is to employ a general purpose computer with its inputs, outputs, and processing specially adapted to operate in the device environment and to execute its programming in the ways described herein. Such may be the most flexible way to implement these embodiments, but the costs to do so may be excessive, especially if only a small portion of the computer's capabilities and resources are employed.

SUMMARY OF THE INVENTION

Briefly, digital electronic appliance embodiments of the present invention empanel several different artificial intelligence (AI) classification technologies into a "jury" that uses combinational digital logic to render "verdicts" about the need for service and impending equipment failures of the machines they monitor. Networks can be used to forward signals from remote locations to a centralized appliance that may be plugged as a module into a server. Or, the appliance outputs can be communicated over networks to servers that will muster appropriate maintenance personnel who are forewarned as to the nature of the trouble.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
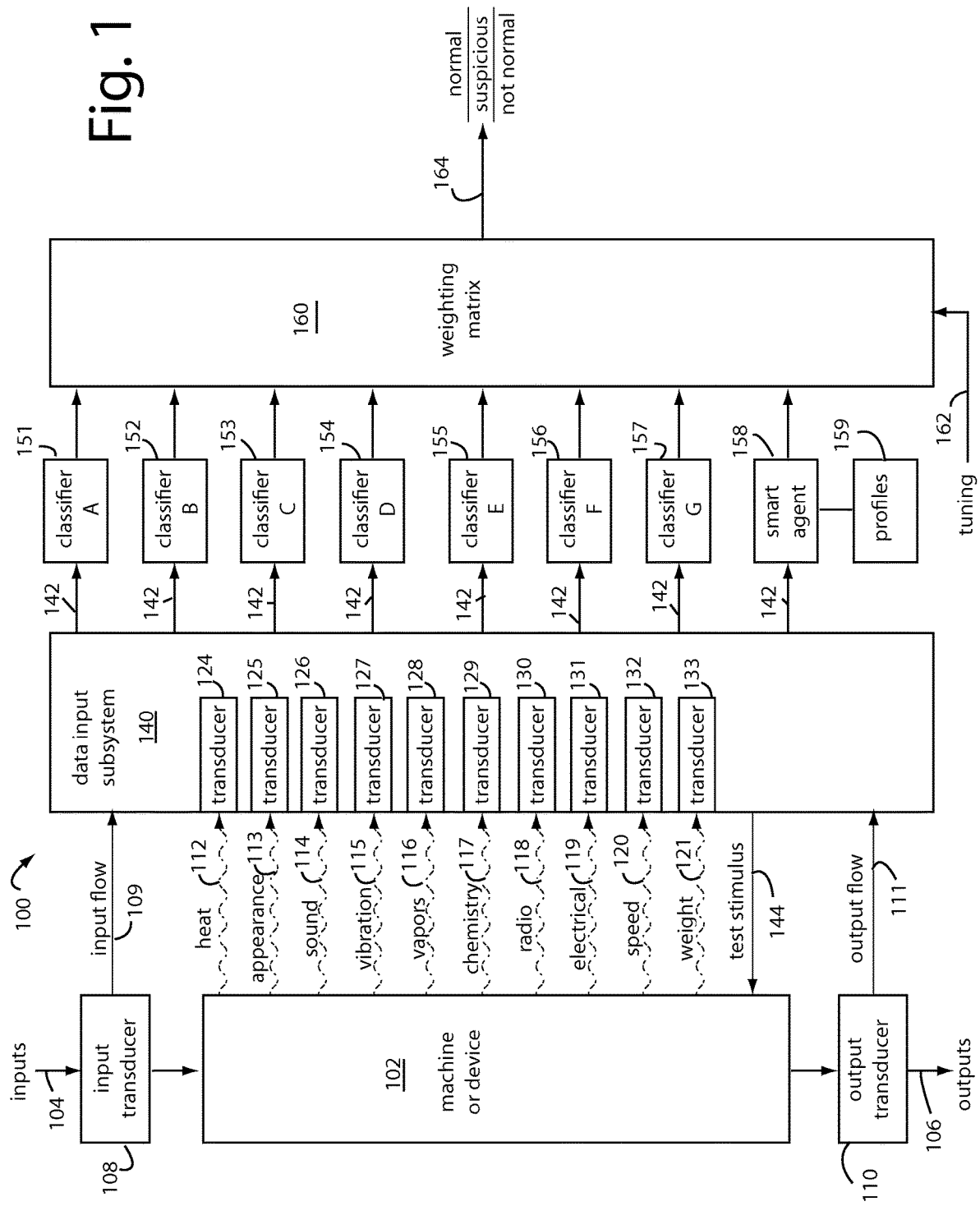
FIG. 1 is functional block diagram an appliance for monitoring a machine and for predicting and reporting its need for service or the probability of an imminent failure.

FIG. 1 represents a group of electronic appliances for monitoring the operation of machines or devices, and for issuing predictions, warnings and calls for preventative maintenance and equipment failures, all in an embodiment of the present invention, and such is referred to herein by the general reference numeral 100. Monitoring appliance 100 is attached to a machine 102 that uses inputs 104 to produce outputs 106. For example, if machine 102 were a diesel electric generator, the primary inputs 104 would be diesel fuel and the primary output 106 would be electrical power, e.g., 440 VAC three phase. Secondary inputs 104 could be motor oil for lubrication and water for cooling. Secondary outputs 106 could be a battery charging 24 VCD output, a local 110 VAC utility for lighting.

Machine 102 could be anything from a washing machine, to an automobile, to a utility power station, to a computer mainframe, to a heating furnace, to a ship, to a network server. These would be "things" in the emerging Internet of Things.

Monitoring appliance 100 uses transducers to continuously measure various parameters associated with machine 102. In the example of FIG. 1, an input transducer 108 provides an electrical signal 109 in proportion to some input flow, e.g., 4-20 milliamps to represent 0-10 milliliters per minute or 0-100 liters of diesel per hour. An output transducer 110 provides an electrical signal 111 in proportion to some output flow, e.g., 4-20 ma to represent 0-1000 volts or 0-100 kilowatt hours.

Typical equipment, like machine 102, will produce indirect, inadvertent, or consequential symptoms, clues, noise, emissions, evidence, and other outputs 112-121 that can be measured and monitored by various types of corresponding transducers 124-133, as in Table I.

TABLE I

| parameter | transducer | measurement units |
| --- | --- | --- |
| heat | 124 | temperature |
| appearance | 125 | video |
| sound | 126 | audio |
| vibration | 127 | accelerometer |
| vapors | 128 | smoke, carbon monoxide |
| chemistry | 129 | pH acidity |
| radio | 130 | radio/magnetic emissions |
| electrical | 131 | electrical noise |
| speed | 132 | RPM, MPH, % of rated |
| weight | 133 | pounds, kilograms, mass |

Experienced troubleshooters who become familiar with other devices like machine 102 will, over time, get to know the symptoms of an impending failure or an already developed one. Or when service is really needed, as opposed to a scheduled time coming near. This experience can be "canned" for use by automation and artificial intelligence.

Internal combustion engines are well known to produce rattles, vibrations, and unusual noises when something has gone wrong. Cars too produce symptoms like loss of power, hard starting, excessive fuel consumption, gas bubbles in the coolant, high operating temperatures, dead batteries, taillight malfunctions, etc. Very often one component will trigger problems with or damage to other components.

A data input subsystem 140 monitors and reports the many readings, measurements, and information collected from transducers 108, 110, and 124-133. The products of the transducers will generally produce expected values within the specifications of machine 102. Each individual machine 102 will settle on some variations from average or mean values that become its norms. Different kinds of devices 102 will express different suites of parameters, and not every or all parameters will be harbingers that can be useful in these embodiments. Those represented here are just typical. Some parameters can be computed from one or more of the measured parameters, e.g., totalized hours of operation, or efficiency like miles per gallon.

The measured and computed attributes of machine 102 are numerous and can be used to render a "picture" of machine 102 each instant and "movies" over spans of time. These attributes are collected and distributed into parallel attribute sets 142, wherein each set 142 repeats all the same attributes derived from all the transducers.

Sometimes it is necessary to apply a test or a combination of test stimulus 144 to the machine 102 to get it to respond in a certain or helpful way that can be observed and analyzed. For example, a test stimulus 144 could be controls to do a hard reset, or a stop/start cycle.

In the virtual world of a computer, the parallel attribute sets 142 replace the actual physical machine 102 and act as abstractions of it. If the parallel attribute sets 142 are comprehensive, then a complete "picture" can be had. In one sense, the actual physical machine 102 becomes completely intangible. The parallel attribute sets 142 dissolve into digital or analog values that data processing systems can manipulate and analyze. Machine 102 abstracts a virtual "entity" that is fully represented by its attributes.

A parallel panel or "jury" of classification engines (A-G) 151-157 each apply different techniques and methods to analyze, interpret, and scrutinize identical parallel attribute sets 142. The objective is to get a variety of perspectives using a variety of classical classification technologies to "decide" if the inputs they see are normal or not. Here, the present combination existing at the instant on the inputs is assigned by each classification engine (A-G) 151-157 to one of several categories.

The input data for any classification task is a collection of records. Each record, instance, for example, is characterized by a tuple (x, y), where x is the attribute set and y is a special attribute, designated as the class label, category or target attribute. For example, vertebrates can be classified into mammals, birds, fish, reptiles, and amphibians. The attribute set includes properties and abilities. The attribute sets can be continuous. The class label, in contrast, must be a discrete attribute. This is a key characteristic that distinguishes classification from regression, where y is a continuous attribute in a predictive modeling task.

A smart agent 158 receives the same inputs as classification engines (A-G) 151-157, but runs a number of short-term, long-term, and recursive profiles 159 to characterize what is routine and what seems to be an excursion from average operations.

A weighting matrix 160 acts as a judge presiding over the jury. Except here, the weighting matrix 160 can give more or less weight to each "vote" produced by a classification engine (A-G) 151-157 and smart agent 158. A courtroom judge is not allowed to disassemble the verdict of a courtroom jury. Here, weighting matrix 160 receives tuning inputs 162 in the form of a priori information, e.g., experience, training, memory, skills, events, extraneous data, news, or business directives to influence which classification engines (A-G) 151-157 are to be given more credence. The consequence of all this is to output a finding or "judgment" 164, e.g., normal, suspicious, or not normal. In the case of a preventative maintenance application, nominal, service needed by part X for reason Y, or imminent failure or outright failure due to W.

Figure 2:
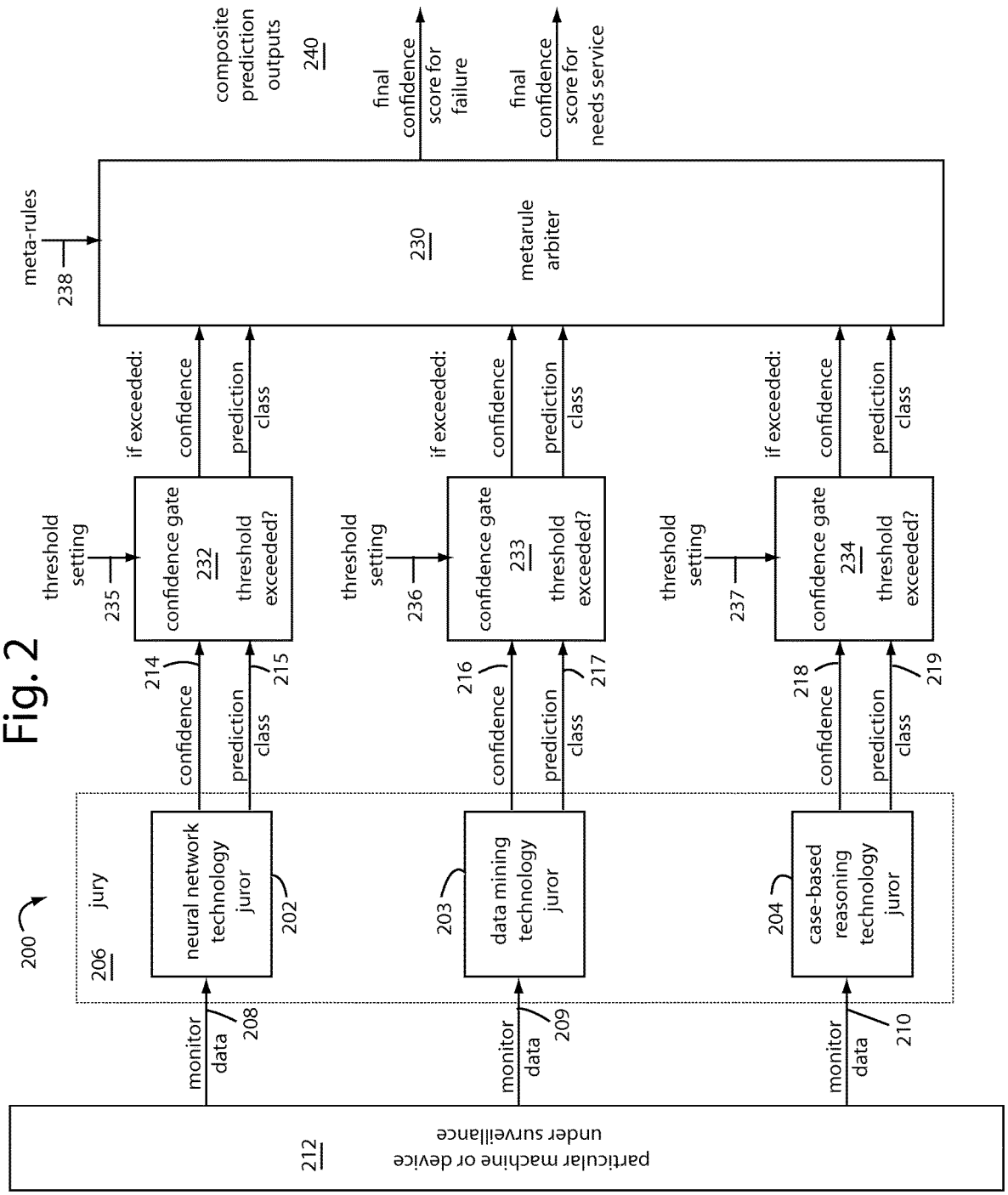
FIG. 2 is functional block diagram of a variety of classification technologies arranged as "jurors" in a jury panel to receive the same evidence from a machine, but then use their own respective talents and hardwiring to arrive at independent decisions output as "votes"

FIG. 2 represents a machine assembly 200 in which a variety of classification technologies 202-204 are, conceptually speaking, arranged as "jurors" in a jury panel 206 to receive the same monitor data (evidence) 208-210 from a machine 212. Much like jurors in a courtroom jury. Each juror 202-204 then each juror uses their own respective talents and hardwiring to arrive at independent decisions output as "votes" 214-219. But in this jury, the "verdict" the jurors deliver are a prediction 215, 216, and 218, e.g., "failure" or "needs service", and how confident the prediction is, e.g., in a confidence score 215, 217, and 219, for example, ranging 0.00 to 1.00.

The development and construction of jurors and jury panels is more fully disclosed in our co-pending Application, U.S. patent application Ser. No. 14/815,848 filed Jul. 31, 2015, AUTOMATION TOOL DEVELOPMENT METHOD FOR BUILDING COMPUTER FRAUD MANAGEMENT APPLICATIONS. Such is incorporated by reference herein, in full.

Many different classifier technologies and models have been developed by artificial intelligence experts over the years. Conventionally, classification models have been implemented as data structures or programs in data processing systems that define parameters for their algorithms and control how the corresponding classification model will use its inputs to classify a transaction, event, or parallel attribute set. Here, we use application specific digital logic to do the same thing, only less expensively, more quickly, and more distally distributed. The classifications can be simple, e.g., good/bad and represented by digital logic bits, 1/0. Or they can be a little more informative like in fraud detection and payment authorization systems, e.g., approved/suspicious/declined, for example with a binary coded decimal on four bit lines, 0-0FH in hexadecimal notation.

Each type of traditional classification model is known to excel in different circumstances and therefore has different uses, e.g., neural networks, decision trees, genetic algorithms, etc. It may not always be known which is going to do well in any given situation, but time and experience with them will reveal the facts. As a juror in a jury panel, and as a result of its hardwiring, each juror has a different perspective, talents, education, training, experience, expectation, external pressures, etc. It will become evident that some jurors in the jury are better readers of the evidence, and a metarule arbiter 230 is wired to prefer or favor particular jurors 202-204.

Individual "votes" 214-219 can be ignored in confidence gates 232-234 if their respective confidences fall below some threshold 235-237. Each confidence value is independently determined by confidence gates 232-234.

So, jurors 202-204 will attach their own confidence in a particular vote they output, and the metarule arbiter 230 can decide for itself if and how much reliance should be placed on each juror 202-204. The metarule arbiter 230 is able to completely overrule the entire jury 206, much the same way a trial judge can enter a "judgment notwithstanding the verdict" (JNOV, non obstante veredicto) in court. A metarules input setting 238 would be used to influence the findings.

Embodiments of the present invention use combinational digital logic circuits to compose composite prediction outputs 240. The multiple artificial intelligence technologies embedded and including our particular smart-agents with real-time and long-term profiling, data mining, neural networks, business rules, fuzzy logic, case-based reasoning, etc. Each technology independently returns its own predictions, confidence scores, and reason details. In general, neural networks cannot be asked about their predictions and their scores.

Final scores are asserted proportional to the health of the equipment, and comments like "service required now" and a computed likelihood of future failures. Otherwise, the equipment/device has no issue.

A variety of digital devices can be used to calculate a final score.

Flag settings in ordered rules are used to indicate how best to process each technology's predictions into a composite conclusion. For example, a first rule for a neural network technology is given a threshold of 0.75. A second rule for a data mining technology is given a threshold of 0.7. A third rule for a case-based reasoning technology is given a threshold of 0.8. These initial threshold settings often are the results of experience or testing.

| GIVEN FLAG SETTINGS | | |
|---|---|---|
| prediction type | classifier AI technology | assigned threshold |
| all | neural network | 0.75 |
| all | data mining | 0.7 |
| all | case-based-reasoning | 0.8 |

In one illustration, these three technologies provide a real-time set of predictions in parallel of 0.7, 0.8. and 0.4, respectively, for a particular machine or device under surveillance.

| EXAMPLE PREDICTIONS | | |
|---|---|---|
| prediction class | classifier AI technology | instant confidence |
| failure | neural network | 0.7 |
| failure | data mining | 0.8 |
| service needed | case-based-reasoning | 0.4 |

In the example, a first rule looks at the neural network technology's confidence of 0.7 and sees that in this instance the confidence is below the given threshold of 0.75, so this is dismissed and the next prediction is considered. A second rule looks at a data mining technology's confidence of 0.8 and sees that in this instance it is above the given threshold of 0.7, so this prediction is flagged to be incorporated in a composite output prediction. A third rule looks at the case-based-reasoning technology's confidence of 0.4 and sees that in this instance the confidence is below the given threshold of 0.8, and so this one too is dismissed and any next predictions are considered.

It is also possible with the prediction class to associate a first higher threshold for future failure predictions, and a second lower threshold that triggers a call for equipment service or maintenance.

A winner-take-all method is used to group individual predictions by classes. Each technology has its own weights, e.g., the one used when to predict a "risk of failure", another one used to predict a "need for service". All such similar predictions are grouped together by summing their weighted confidences. The sum of the weighted confidences is then divided by the sum of the weights used in order to obtain a final confidence score, e.g., ranging between 0.00 and 1.00.

Consider the following example:

| WEIGHTS | | |
|---|---|---|
| classifier AI technology | weight: failure | weight: need service |
| neural network | 2 | 2 |
| data mining | 1 | 1 |
| case-based-reasoning | 2 | 2 |

| PREDICTIONS | | |
|---|---|---|
| prediction class | classifier AI technology | instant confidence |
| failure | neural network | 0.7 |
| failure | data mining | 0.8 |
| service needed | case-based-reasoning | 0.4 |

In this example, two technologies are predicting a failure, so their cumulated weighted confidence is: 2*0.7+1*0.8, or 2.2. Only one technology is predicting "needs service", so its weighted confidence is simply, 1*0.4, or 0.4. Since "2.2" is greater than "0.4", the final score is scored as a risk of failure. The confidence is then normalized by dividing it by the sum of the weights that where associated with failure (2 and 1), so the final confidence is 2.2/(2+1), or 0.73.

It is possible to create models that can predict more than "risk of failure" or "needing service" categories. Business rules can be written to combine the final scores of the several technologies.

Each business rule comprises the name of rule, and its conditions like "if the data mining confidence is greater than 75% then . . . ". Conclusions are written like " . . . then there is a risk of failure with a confidence of 80%". The kinds of "final score rules" that can be written depend on the application and the experts available. In an example 1, "if data mining confidence is greater than 75%, and the equipment contains dangerous products, then then . . . ". In an example 2, "if the data mining prediction is risk of failure, and the case-based reasoning prediction is "service needed" then . . . ".

Testing the models allows their tuning. For example, if during a testing phase of a predictive model for data mining scores the class «Service», with low number of errors, then a high weight is assigned to the service class for data mining. But if the neural networks do not correctly predict when service was needed, a lower weight is assigned for the service class compared to the neural networks.

Each of the several technologies can have a weight used to predict "risk of failure", and a different weight to predict "service required". More than these two classes of "risk of failure" and "service required" are possible.

This is more than one way to implement and embody the present invention into digital electronics hardware. A first is a completely custom circuit design with the circuits executed in a silicon integrated circuit, e.g., in a so-called Application Specific Integrated Circuit (ASIC). Another is to employ a field-programmable gate array (FPGA) in which optional circuits are more or less permanently wired together by the irreversible destruction of fuses or anti-fuses.

A "smart agent" by our definition is a data structure prearranged within a computer memory to epitomize an entity or thing in all its essentials by the entity's attributes, history, and behaviors that are manifest, e.g., from specifications, programming, sensors, and transaction data. Each smart agent allows an electronic rendering of the entity or thing it is consigned to in several different and selectable dimensions. Each smart agent can be equipped with "action items" or a "job description" that boils down into clocking a series of steps in a finite state machine (FSM), given various conditions being present in its data, sensors, programming, or other data solicited from other smart agents. Such finite state machine can issue output signals and triggers in each step to other smart agents. The computer processor resources necessary to support such functionality are specially adapted to read/write the data structures in memory, run the finite state machines, provide the inputs, and generate the outputs. In the field, such computer processor resources can be a shared mobile device, an embedded microcomputer, or batch processor. A typical smartphone today represents all the sensor, processing, and communications hardware a typical smart agent would need.

A smart agent can exist at some central location pooled with hundreds, thousands, or even millions of others that receive transaction records reporting the remote activities of the corresponding participants each is assigned to follow. For example, inside a network server they can interoperate and intercommunicate fairly freely and efficiently.

In the Internet-of-Things, the hundreds, thousands, or even millions of participants can be widely dispersed and are each assigned and equipped with a smart agent that is able to communicate with the others. Nowadays, that communication would rely on a wireless technology like WiFi, Bluetooth, NFC, GSM, 4G, etc. Some wireless technologies can breach long distances, others have the advantage of needing to be proximate or very close. That may help secure access to authorized (local) users in a very simple way hard to subvert.

Participants and entities in general are describable by their attributes. Even in widely diverse groups. In one sense, such participants and entities are nothing more than the sum of their attributes. Groups too. And attributes too are describable by their attributes. For example, if one attribute of an entity with a smart agent attached was the color blue, then a smart agent for "blue" could have as its attributes all the users who have the attribute blue. Another attribute could be a paint manufacturer's paint formula code for the blue. Accessing the blue smart agent would get you links immediately to every other smart agent describing itself as blue.

Attributes can be independently variable, fixed, or programmable. The operational status (on/off) of a device can be an independent variable reportable as an attribute. As are ambient temperature, noise, vibration, load, voltage, fuel level, service age. The model and serial number of a device can be a fixed attribute, as are assigned location, color, weight, specifications. A programmable attribute can be like start/stop, accelerate/decelerate, inflate/deflate, heat/cool.

Not all attributes need to be communicated. It may be safe or reasonable to assume or interpolate. For example, to limit communications bandwidth demands.

A piece of machinery can be a "thing" in the Internet-of-Things. Such could be equipped with appropriate sensors to measure ambient noise, temperature, load, output, energy consumption, vibration, etc. Measured and logged over time these attributes will usually fall into some routine or normal pattern of behavior. Smart agent profiles can be used to store and characterize what is normal for its "thing". Deviations from such normalcy can spell trouble, warn of impending failure, call for maintenance, signal intrusion, etc. The smart agent itself can be designed to take some kind of action, e.g., by communicating a "check machine" warning.

For a car, a location attribute would be an independent variable requiring a sensor like a GPS receiver. But for a utility power transformer, the location would normally be fixed. It could however be programmable, as in the case where a new utility power transformer is located in a warehouse inventory, then assigned to be installed on a utility pole, or has been removed to a hazardous waste site to have its toxic oil reserves removed. In this later case, the smart agent could be implemented within the utility power transformer, but would be better in a virtual location that always had power and communications to stay alive. Like an on-line dossier file.

The "thing" smart agents can comprise attributes that have corresponding "attribute" smart agents among 121-127. Discovering or broadcasting to all "thing" smart agents that share a particular attribute would be immediately and directly accessible and quantifiable by the particular "attribute" smart agent 121-127 within server 128. For example, if the attribute were "MasterCard", then all credit card entities or things 101-105 with that attribute would be immediately accessible. In another example, if the attribute were "California AKW 887", then any automobile thing 101-105 with that license plate attribute would be immediately accessible and available to be queried to report its GPS location.

Text Mining is used, for example, to extract maintenance personnel notes from complex machinery equipment maintenance logs. Such logs assemble comments about equipment component failures and associated repairs. Text mining and unsupervised text clustering excerpt information summarizing the actions and components addressed to a particular machine and its operating cycles, maintenance schedules, periodic breakdowns, and to identify abnormal failure rates, triggers and alerts.

Text Mining in general is an automated process of extracting some previously unknown information from analysis of unstructured texts. Text Mining looks to be similar to Data Mining, but there are substantial differences. Data mining uses pattern-extraction of databases. Text Mining crawls over natural language texts. Text-mining differs also from web-searching where the information being searched already exists. In Text Mining, machines extract something new from an already available resource. Fuzzy logic can be applied to text-mining, e.g., for document clustering into pre-specified clusters. Documents can be classified into categories, such as relevant and irrelevant. In a first step, documents are cleaned of advertisements and tags. Hyphens are eliminated and stop words are removed. Word stemming is used to represent words by their roots. Each document can then be represented as an assembly of words. Weights are assigned to words on the basis of their respective significance in the document, e.g., frequency of occurrence.

Word frequency can be calculated as:

$$WF=(Word\ Count/(Total\ Words\ in\ the\ Document))\times 10000;$$

where, "m" is the number of words are chosen and each document is represented as a set of "m" values which are the WF values of those corresponding "m" words in that document.

Fuzzy Logic and text-mining can be used to cluster similar documents together. Document Clustering is used by a machine to group documents into meaningful groups, e.g., using c-means algorithm. Such algorithm comprises two types, Hard c-means and Fuzzy c-means (FCM). Hard c-means algorithms cluster "m" observations into "c" clusters. Each cluster has a cluster center. Each observation fits into the least distant cluster. Each observation is strictly clustered into a single cluster. FCM is a variation of the hard c-means clustering algorithm. Every observation has a membership value associated with each of the clusters which is inversely related to the distance of the observation from the center of the cluster.

FCM can cluster documents into a required number of categories. A priori information is used to fix these clusters.

Unsupervised Clustering groups data instances together in groups based on their similarities. Clustering is a process of organizing member into groups that are similar in some respect. A similarity is measured by a distance related to an attribute value. Each cluster is dissimilar to the members in other clusters. Clustering algorithms are usefully applied in marketing to find groups of customers with similar buying behaviors and other attributes that can be reported and followed.

Given a set of N items susceptible to being clustered, and an N*N distance (or similarity) matrix, the basic process of hierarchical clustering involves:

1. Assigning each item to its own cluster, such that for N items, there are N clusters, each with just one item;
2. A series of attempts are made to pair each cluster with other clusters, and to merge each candidate into the one cluster. Fuzzy logic can be used to calculate the degree of membership of each item in other clusters;
3. An attribute value that represents the common values of the members of each cluster is changed; and
4. Steps 2-3 are repeated until the minimum number of clusters desired has been assembled.

Association learning is used to discover relevant associations and dependencies between entities and within an entity's behavior. It is useful for identifying connections among elements, communication habits, and hidden relationships. Associative learning is used in marketing, in fraud prevention, and Failure Prevention. For example, a loss of cooling in a machine can cause damage to several other components that will need to be targeted in a maintenance directive.

The dependencies and what always goes together can be learned by one entity given a long time, or by many entities in parallel, e.g., warm weather means more ice cream will be sold. Analyzing billions of transactions during long periods (months, years) with data processing systems can discover things that are impossible for humans to see directly.

The digital logic table-lookup implementation of a decision tree can be realized with a programmable read only memory (PROM) device. The input variables are connected to the address bit inputs of the PROM. One binary variable each to each address bit. The memory locations that they address in combination are programmed with bits that represent the decision tree's decision for each input combination.

Case-based reasoning can similarly be implemented with digital logic devices. For example, with content-addressable-memory (CAM). Cases, really sets of input conditions, can be matched with previous cases that were solved. The solutions are encoded into the CAM locations addressed.

Neural networks are implementable in digital logic devices. For example, an FPGA implementation of a multilayer perceptron neural network was presented by D. Ferrer and published in Design, Automation and Test in Europe Conference and Exhibition, 2004. Proceedings (Volume:3). The system is parameterized both in network related aspects, e.g., number of layers and number of neurons in each layer, and implementation parameters, e.g., word width, pre-scaling factors and number of available multipliers). This allows the design to be used in many different network realizations, or to try different area-speed trade-offs simply by recompiling the design. Fixed-point arithmetic with pre-scaling configurable in a per layer basis was used. The system was tested on an Altera ARC-PCI board. Several examples from different application domains were implemented showing the flexibility and ease of use of the obtained circuit. Even with the rather old board used, an appreciable speed-up was said to be obtained compared with a software-only implementation based on MATLAB neural network toolbox.

Smart agents can be implemented with digital logic devices. This especially makes sense when one smart agent is paired with one machine out-in-the-wild. And even more so if the machines are mass produced and participate in the emerging Internet-of-Things (IoT). E.g., an application specific integrated circuit (ASIC) having embedded writeable non-volatile memory to store real-time, long-term, and recursive profile information.

Figure 3:
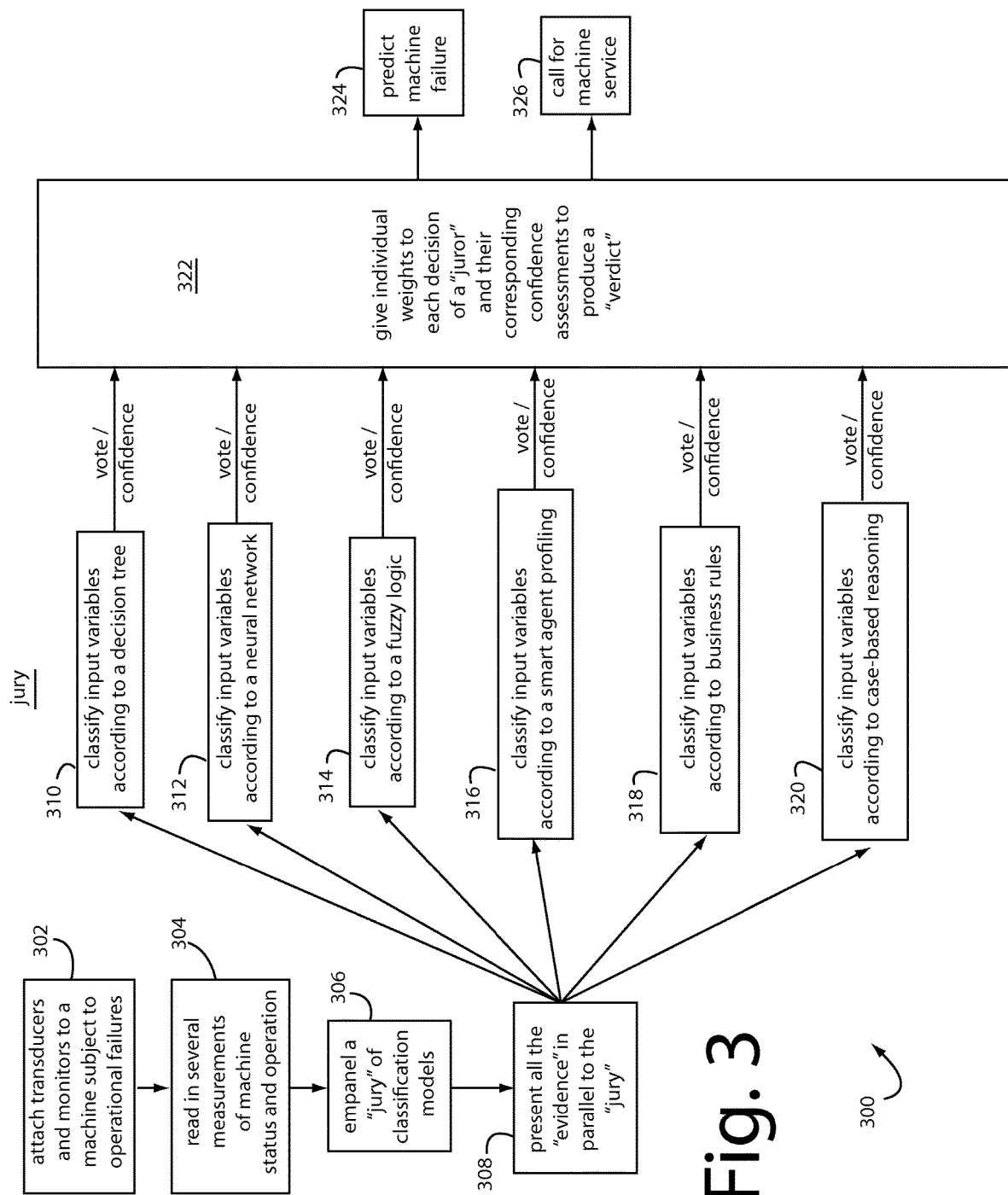
FIG. 3 is a flowchart diagram illustrating a method embodiment of the present invention for monitoring the operation of machines and for issuing calls for preventative maintenance and predictions of equipment failures.

FIG. 3 represents a method embodiment of the present invention for monitoring the operation of machines and for issuing calls for preventative maintenance and predictions of equipment failures, and is referred to herein by the general reference numeral 300. A step 302 attaches monitoring devices, instruments, and transducers to a machine subject to operational failures. A step 304 reads in the measurements and data obtained by the monitoring devices, instruments, and transducers regarding the status and operation of the machine. A step 306 empanels a "jury" of classification models as "jurors" to assess the measurements and data obtained. A step 308 presents all the measurements and data obtained to the empaneled jury for each juror's consideration.

A step 310 classifies the measurements and data obtained and presented to the jury according to a logic decision tree and outputting a juror vote that includes a confidence assessment.

A step 312 classifies the measurements and data obtained and presented to the jury according to a neural network and outputting another juror vote that includes a confidence assessment.

A step 314 classifies the measurements and data obtained and presented to the jury according to a fuzzy logic and outputting another juror vote that includes a confidence assessment.

A step 316 classifies the measurements and data obtained and presented to the jury according to a smart agent profiling and outputting another juror vote that includes a confidence assessment. Such profiling includes short-term, long-term, and recursive profiling.

A step 318 classifies the measurements and data obtained and presented to the jury according to business rules and outputting another juror vote that includes a confidence assessment. "Business Rules" here can include actual business enterprise policies and distilled service expertise.

A step 320 classifies the measurements and data obtained and presented to the jury according to case-based reasoning and outputting another juror vote that includes a confidence assessment. A "case" here could be a previous situation in which a high coolant temperature caused a deterioration of the lubricants in an engine, for example.

A step 322 collects together all the juror votes into a single "ballot" and mathematically applies individual weights in calculations to each respective juror vote with respect to its own confidence assessment and an a priori data input 323. The a priori data inputs 323 represent how confident a "judge" is in each juror. In a courtroom jury, judges are not allowed to separate the votes in a jury ballot and verdict. Nor can they use their wisdom, experience, and training to give weight or even dismiss a juror's individual vote. In method 300 the "judge" embodied in step 322 can do all of that and more.

Step 322 includes tallying a verdict from the results obtained in the previous steps, and that predicts an operational failure of the machine in a report it issues to service personnel and management.

Step 322 further includes tallying another verdict from the results obtained in the previous steps. A summons for service personnel to do a particular service procedure and/or a replacement part for the machine is made by outputting another report.

In summary, method 300 reduces the costs of maintaining machines.

In alternative embodiments of method 300 a step can be included that classifies the measurements and data obtained and presented to the jury according to an associative-learning juror included within the jury, and that calculates its decisions on the basis of associations between responses observed at its inputs to any particular stimulus it has previously learned, and outputting another juror vote that includes a confidence assessment.

In alternative embodiments of method 300 a step can be included that classifies the measurements and data obtained and presented to the jury according to clustering logic included within the jury panel, and that calculates its output decisions on the basis of clusters observed in the input data, and outputting another juror vote that includes a confidence assessment.

In alternative embodiments of method 300 a step can be included that classifies the measurements and data obtained and presented to the jury according to an optimization logic included within the jury panel, and that calculates its output decisions on the basis which combinations of values then at its inputs are constrained as allowable and which combinations are not, and outputting another juror vote that includes a confidence assessment.

In alternative embodiments of method 300 a step can be included that classifies the measurements and data obtained and presented to the jury according to a text mining logic included within the jury panel, and that bases its output decisions on an automated process of extracting information from analyses of unstructured texts at its inputs, and outputting another juror vote that includes a confidence assessment.

In alternative embodiments of method 300 a step can be included that "cleans" the data between a machine monitoring device and the jury panel, and including data-correction, data-deletion, and data-formatting to produce a single-format data structure at its output.

In alternative embodiments of method 300 a step can be included that enriches the data between a machine monitoring device and the jury panel, and including data-insertion, data-computation, and data-formatting logic in combination to produce an enriched single-format data structure at its output.

Figure 4:
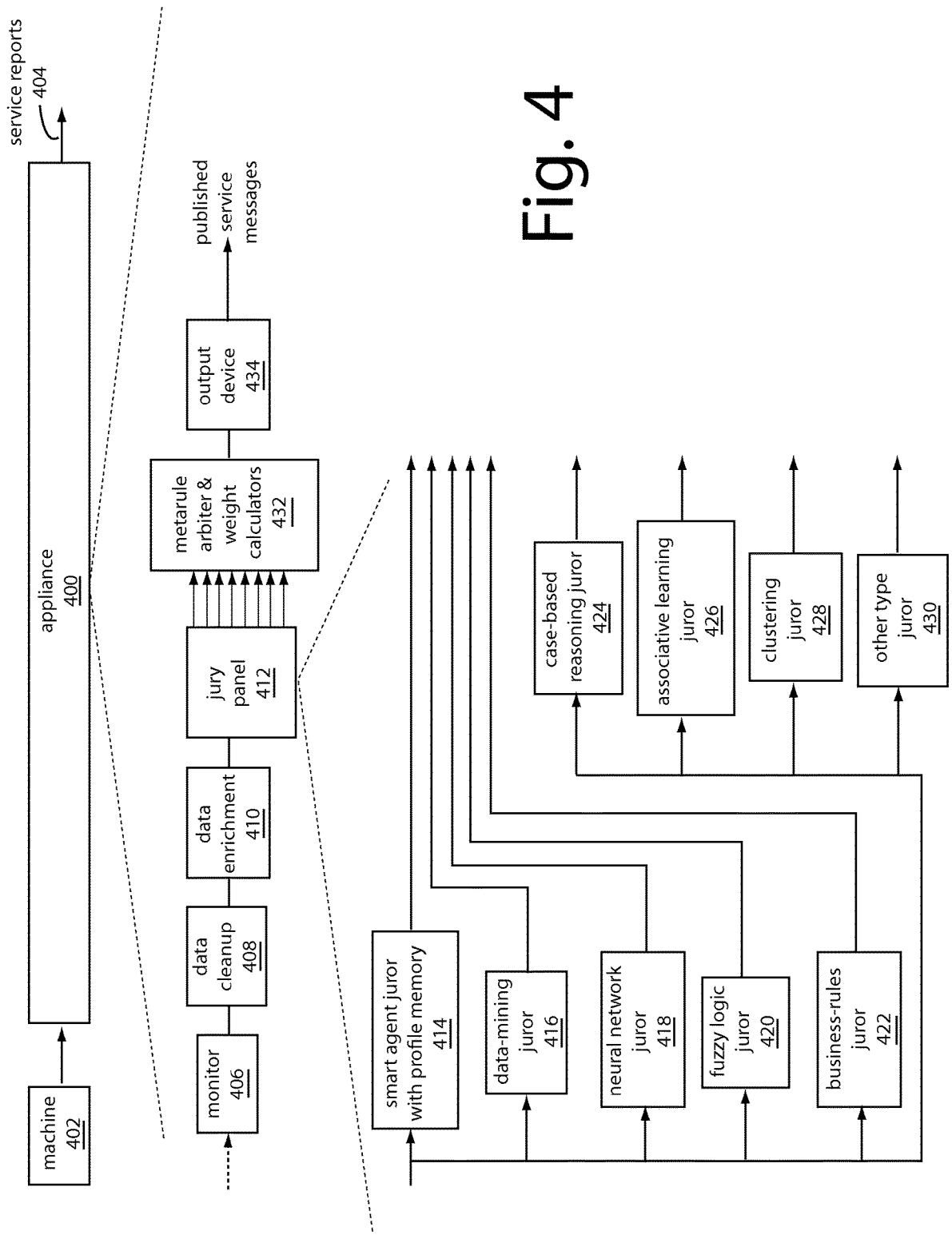
FIG. 4 is a functional block diagram of a digital electronic application specific integrated circuit (ASIC) embodiment of the present invention.

FIG. 4 illustrates an electronic appliance 400 for monitoring the operation of a machine 402 and for issuing calls for preventative maintenance and warnings of equipment failures in service reports 404. A monitoring device 406 receives electrical signals from transducers, pickups, and meters mounted to machine 402. These continuously measure (in parallel) a variety of operational parameters of the machine. The measurements are each electrically represented by voltages, currents, and/or digital data so the information can be accepted and used by combinational digital logic. A data cleanup device 408 removes noise, extraneous information, and unverified data. It further normalizes the data into standard formats and data structures. A data enrichment device 410 adds attributes to the data that can be interpreted, extrapolated, or calculated from the normalized data.

A jury panel 412 represents a digital logic assembly of several juror modules with electrical input connections that each receive the same cleaned-up, enriched operational parameter measurements of machine 802 at the same time, and each independently deliberate in solitude on an independent juror vote. Each juror makes its decisions in a different way and communicates as a juror-vote in a digital output.

A smart-agent juror module 414 is included within the jury panel 412 and includes a real-time profiling logic and storage memory, a long-term profiling logic and storage memory, and a recursive profiling logic and storage memory, in parallel between its inputs and outputs.

A data-mining juror module 416 is included within the jury panel 412 and includes a logic decision tree between its inputs and its outputs.

A neural-network juror module 418 is included within jury panel 412 and includes neural network logic between its inputs and its outputs.

A fuzzy logic juror module 420 is included within jury panel 412 and includes fuzzy logic between its inputs and its outputs to automatically cluster information into a plurality of risk categories and decreases sensitivity to noisy or outlier data.

A business-rules juror module 422 is included within jury panel 412 and includes business rules logic between its inputs and its outputs.

A case-based reasoning juror module 424 is included within jury panel 412 and includes representations of previous case sets of operational parameters of similar machines and past decisions determined to be successful ones, and a comparator to match these previous cases to a current set of operational parameters of the machine provided at its inputs, and an output for its conclusions.

An associative-learning juror module 426 is included within jury panel 412 and calculates its output decisions on the basis of associations between responses observed at its inputs to any particular stimulus it has previously learned.

A clustering juror module 428 is included within jury panel 412 and includes clustering logic between its inputs and its outputs.

Other types of classification model jurors 430 can be added to the jury panel 412 to add their unique perspectives to a diverse jury panel.

A metarule arbiter module 432 includes several weight calculators that each respectively receive a corresponding one of the independent juror-vote digital outputs. Such further includes a digital summation device that tallies a single composite prediction output.

An output device 434 transforms the composite prediction output into a human-readable form.

The other types of classification model jurors 430 mentioned can include an optimization-suite juror module included with the jury panel, and that includes optimization logic that specifies which combinations of values then at its inputs are constrained as allowable and which combinations are not, and that produces its decision at its outputs as digital data.

The other types of classification model jurors 430 mentioned can include a text mining juror module is included within jury panel 412 and includes text mining logic between its inputs and its outputs as digital data.

The other types of classification model jurors 430 mentioned can include a data cleaning device connected between the machine monitoring device and the jury panel, and that includes data-correction, data-deletion, and data-formatting logic that combine to produce a single-format data structure at its output.

The other types of classification model jurors 430 mentioned can include genetic algorithm component logic.

The other types of classification model jurors 430 mentioned can include phonetic algorithm component logic. and The other types of classification model jurors 430 mentioned can include field machine algorithm component logic.

The data enrichment device 410 connected between the machine monitoring device 406 and the jury panel 412 further can include includes data-insertion, data-computation, and data-formatting logic in combination to produce an enriched single-format data structure at its output.

The other types of classification model jurors 430 mentioned can include a velocity-analyzer juror module is included within jury panel 412 and includes velocity analyzing and data compression logic between its inputs and its outputs.

The other types of classification model jurors 430 mentioned can include an optimization suite juror module is included within jury panel 412 and includes optimization logic that specifies which combinations of values then at its inputs are constrained as allowable and which combinations are not, and that produces its decision at its outputs.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed:

1. At least one computer network server for monitoring the operation of machines, the at least one server comprising:
   one or more processors;
   non-transitory computer-readable storage media having computer-executable instructions stored thereon, wherein when executed by the one or more processors the computer-readable instructions cause the one or more processors to—
   receive measurement data from a plurality of monitoring appliances, each of the plurality of monitoring appliances being in communication with a corresponding one of a plurality of machines and the measurement data reflecting status and operation of the plurality of machines;
   compute juror votes for each of the plurality of machines at least in part by—
      inputting at least a portion of the measurement data relating to the corresponding machine to one or more classification models selected from among a logic decision tree, business rules, case-based reasoning, data mining, a neural network and fuzzy logic, to generate one or more model juror votes each corresponding respectively to one of the one or more classification models,
      inputting at least a portion of the measurement data relating to the corresponding machine to a smart agent comprising a representation of historical data of the corresponding machine, to generate a smart agent juror vote,
   compute at least one verdict for each of the plurality of machines at least in part by inputting the corresponding one or more model juror votes and smart agent juror vote to a weighting matrix, the at least one verdict reflecting a predicted operational failure; and
   output, for at least one of the plurality of machines and based at least in part on the corresponding at least one verdict, a service message reflecting a recommendation for one or both of: scheduling a service call and ordering a replacement part.

2. The at least one computer network server of claim 1, wherein the weighting matrix is configured to adjust, in computing the at least one verdict for each of the plurality of machines, the relative prominence of respective ones of the juror votes based at least in part on one or more client tuning inputs.

3. The at least one computer network server of claim 2, wherein the juror votes respectively include confidence assessments, and the weighting matrix is configured to adjust the relative prominence of respective ones of the juror votes based in part on the confidence assessments.

4. The at least one computer network server of claim 1, wherein the one or more classification models include a classification model for each of a logic decision tree, business rules, case-based reasoning, a neural network and fuzzy logic.

5. The at least one computer network server of claim 1, wherein the one or more classification models include one or more an associative-learning juror, an optimization logic juror, a text mining logic juror and a clustering logic juror.

6. The at least one computer network server of claim 1, wherein the computer-readable instructions further instruct the one or more processors to, for each of the plurality of machines, clean the related portions of the measurement data to produce cleaned data according to a single-format data structure, the cleaning including one or more of correction, deletion and reformatting.

7. The at least one computer network server of claim 1, wherein the one or more classification models include a velocity-analyzer juror.

8. Non-transitory computer-readable storage media having computer-executable instructions for monitoring the operation of machines, wherein when executed by at least one processor the computer-readable instructions cause the at least one processor to:
  receive measurement data from a plurality of monitoring appliances, each of the plurality of monitoring appliances being in communication with a corresponding one of a plurality of machines and the measurement data reflecting status and operation of the plurality of machines;
  compute juror votes for each of the plurality of machines at least in part by—
    inputting at least a portion of the measurement data relating to the corresponding machine to one or more classification models selected from among a logic decision tree, business rules, case-based reasoning, data mining, a neural network and fuzzy logic, to generate one or more model juror votes each corresponding respectively to one of the one or more classification models,
    inputting at least a portion of the measurement data relating to the corresponding machine to a smart agent comprising a representation of historical data of the corresponding machine, to generate a smart agent juror vote,
  compute at least one verdict for each of the plurality of machines at least in part by inputting the corresponding one or more model juror votes and smart agent juror vote to a weighting matrix, the at least one verdict reflecting a predicted operational failure; and
  output, for at least one of the plurality of machines and based at least in part on the corresponding at least one verdict, a service message reflecting a recommendation for one or both of: scheduling a service call and ordering a replacement part.

9. The non-transitory computer-readable storage media of claim 8, wherein the weighting matrix is configured to adjust, in computing the at least one verdict for each of the plurality of machines, the relative prominence of respective ones of the juror votes based at least in part on one or more client tuning inputs.

10. The non-transitory computer-readable storage media of claim 9, wherein the juror votes respectively include confidence assessments, and the weighting matrix is configured to adjust the relative prominence of respective ones of the juror votes based in part on the confidence assessments.

11. The non-transitory computer-readable storage media of claim 8, wherein the one or more classification models include a classification model for each of a logic decision tree, business rules, case-based reasoning, a neural network and fuzzy logic.

12. The non-transitory computer-readable storage media of claim 8, wherein the one or more classification models include one or more an associative-learning juror, an optimization logic juror, a text mining logic juror and a clustering logic juror.

13. The non-transitory computer-readable storage media of claim 8, wherein when executed by at the least one processor the computer-readable instructions further cause the at least one processor to, for each of the plurality of machines, clean the related portions of the measurement data to produce cleaned data according to a single-format data structure, the cleaning including one or more of correction, deletion and reformatting.

14. The non-transitory computer-readable storage media of claim 8, wherein the one or more classification models include a velocity-analyzer juror.

15. A computer-implemented method for monitoring the operation of machines comprising, via one or more transceivers and/or processors:
  receiving measurement data from a plurality of monitoring appliances, each of the plurality of monitoring appliances being in communication with a corresponding one of a plurality of machines and the measurement data reflecting status and operation of the plurality of machines;
  computing juror votes for each of the plurality of machines at least in part by—
    inputting at least a portion of the measurement data relating to the corresponding machine to one or more classification models selected from among a logic decision tree, business rules, case-based reasoning, data mining, a neural network and fuzzy logic, to generate one or more model juror votes each corresponding respectively to one of the one or more classification models,
    inputting at least a portion of the measurement data relating to the corresponding machine to a smart agent comprising a representation of historical data of the corresponding machine, to generate a smart agent juror vote,
  computing at least one verdict for each of the plurality of machines at least in part by inputting the corresponding one or more model juror votes and smart agent juror vote to a weighting matrix, the at least one verdict reflecting a predicted operational failure; and
  outputting, for at least one of the plurality of machines and based at least in part on the corresponding at least one verdict, a service message reflecting a recommendation for one or both of: scheduling a service call and ordering a replacement part.

16. The computer-implemented method of claim 15, wherein the weighting matrix is configured to adjust, in computing the at least one verdict for each of the plurality of machines, the relative prominence of respective ones of the juror votes based at least in part on one or more client tuning inputs.

17. The computer-implemented method of claim 16, wherein the juror votes respectively include confidence assessments, and the weighting matrix is configured to adjust the relative prominence of respective ones of the juror votes based in part on the confidence assessments.

18. The computer-implemented method of claim 15, wherein the one or more classification models include a classification model for each of a logic decision tree, business rules, case-based reasoning, a neural network and fuzzy logic.

19. The computer-implemented method of claim 15, wherein the one or more classification models include one or more an associative-learning juror, an optimization logic juror, a text mining logic juror and a clustering logic juror.

20. The computer-implemented method of claim 15, further comprising, for each of the plurality of machines, cleaning the related portions of the measurement data to produce cleaned data according to a single-format data structure, the cleaning including one or more of correction, deletion and reformatting.

\* \* \* \* \*